Figure 1:
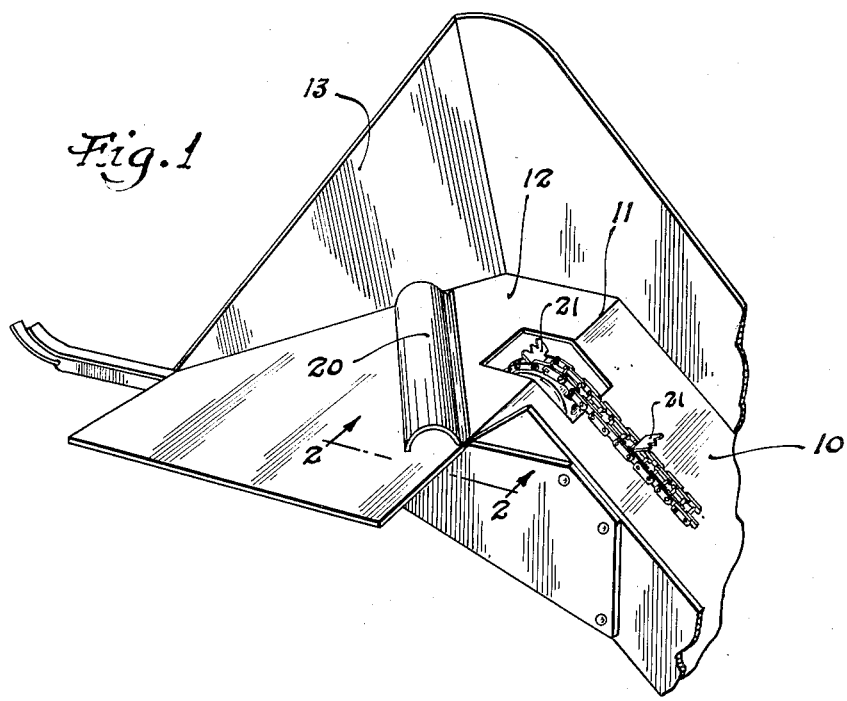

Nov. 4, 1952  F. W. HARRIS ET AL  2,616,551
TABLE FOR BALE LOADERS
Filed March 24, 1950

INVENTORS
Frederick W. Harris
Carl G. Crantz
BY Allan R. Redrow

Patented Nov. 4, 1952

2,616,551

UNITED STATES PATENT OFFICE 2,616,551

TABLE FOR BALE LOADERS

Frederick W. Harris and Carl G. Crantz, New Holland, Pa., assignors to New Holland Machine Division of The Sperry Corporation, New York, N. Y., a corporation of Delaware Application March 24, 1950, Serial No. 151,668

6 Claims. (Cl. 198—65)

This invention relates to conveyors and more particularly is concerned with an improvement on a conveyor adapted for movement through a field to engage, pick up, and deliver bales of hay, previously formed by a hay baling machine, onto a wagon bed that follows the conveyor.

The invention provides an improved construction for use with a bale loader conveyor such as is shown in the co-pending application of Hill and Best, Ser. No. 131,546, filed December 7, 1949, and now abandoned, and the present construction is concerned with an improved means for effecting delivery of the bales from the upfeeding conveyor over onto a table for positioning the bales in a convenient manner for removal onto the wagon bed. In the past, difficulties have been encountered in separating the conveyor flights from the bales in bale loaders of this type, and also a tearing of the bale has been noted when the bales were permitted to remain on the upper table for any period of time. The present invention is incorporated on the table top and functions to hold the individual bales out of contact with the conveyor after they have been delivered up onto the holding platform or table provided at the top of the conveyor. In addition to the difficulties noted above, it has also been found that the ties on some of the bales have been broken by the dragging of the flights of the conveyor against the ties while the bales lay on the table, and the present invention provides a simple arrangement on the table surface to guide the bales in such relation with respect to the table and conveyor that the conveyor may give an efficient lifting action to the bale to raise it onto the table while thereafter the bale is positively held out of the path of the conveyor flights so that they cannot come in contact with the ties of the bale. In following this teaching, all possibility of breaking the tie is eliminated.

The improvement takes the form of a fulcrum means or ridge disposed on the table surface over which the bale is laid after it passes onto the table and the fulcrum line is so placed with respect to the conveyor and table that the bale is delivered over the fulcrum by the conveyor with the center of gravity of the bale on the opposite side of the fulcrum from the conveyor approach side. The arrangement is such that the bale is caused to fall so as to come to rest over the fulcrum with its trailing end pointing upwardly, said end thus being spaced above the flights of the conveyor whereby to preclude the tearing or cutting of the body of the bale or any of its ties such as might otherwise occur.

Figure 2:
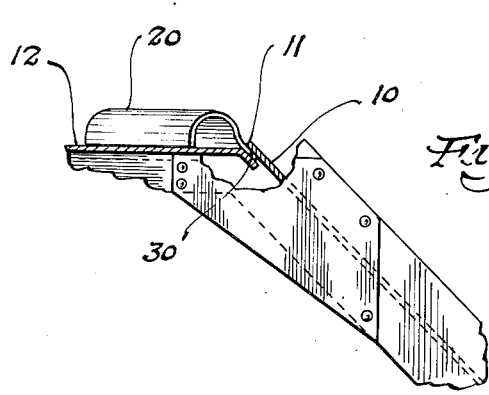

A typical representation of this invention is shown in the drawings wherein:

Figure 1 is a perspective view of the table of a bale loader having the present invention affixed to its surface; and Figure 2 is a view taken on line 2—2 of Figure 1.

Referring to a bale loader such as is shown in the Hill and Best application, there is provided an upwardly inclined chute having a conveyor therein to move the hay bales from the field up through the chute onto a table positioned at the top of the conveyor run. The machine is mounted on a wheeled frame and is adapted to be hitched alongside a truck or wagon bed to be moved through a field to pick up previously formed bales. The nose piece of the bale loader is driven into contact with the bales as they are found in the field to turn the bales into longitudinal alignment with the conveyor chute, and the bales then feed into the throat of the bale loader as the machine progresses along its path whereupon they become engaged on the flights of the conveyor.

The conveyor chute extends from the throat of the machine up to the table at the top end of the chute and the conveyor passes upwardly along a path disposed generally centrally in the floor of the chute. Suitable walls and confining guides may be fixed to the chute to assist in the delivery of the bales up the chute and onto the table.

The basic elements of a bale loader described so far, will be found in the Hill and Best machine as well as other similar structures serving this purpose all of which serve to lift the bale from the field onto the table at the top of the loader. Referring now to the particular improvement here disclosed, and with the above described general structure in mind, the conveyor is operated to feed the bales upwardly through chute 10. When the bale reaches the upper end thereof, the leading end of the bale is projected skyward until the bale is overbalanced on the edge 11 formed by the junction of the floor of the chute with the floor of the table 12, and then the bale falls down and is partly turned inwardly toward the wagon bed by engagement against the guide wall 13 mounted at the back and along the outside edge of the table.

At this point, the improvement of this invention comes into play and as the bale falls, it is engaged over the raised fulcrum means or ridge 20 formed diagonally across the surface of the table. The ridge 20 has a height sufficient to hold the trailing edge of the bale up off of the floor of the table a sufficient distance to effect a complete withdrawal of the bale from the conveyor flights 21. The bale may then be allowed to lay over the fulcrum piece on the table without interference from the flights of the conveyor until the succeeding bale pushes the previously elevated bale off the table or until it is lifted over onto the wagon bed.

The fulcrum piece may take any form such that it will not interfere with the upward feeding of the bale and yet it must be of such a height as to hold the trailing end of the bale well off of the floor of the table end free of advancing flights of the conveyor. A half round shape as shown in the drawings has been found to be particularly effective. The bale pushes up easily over it and if the fulcrum piece is disposed diagonally across, as shown in Figure 1, the bale does not ordinarily come in contact with the piece until it is turned by wall 13 and falls onto the table. To avoid any possibility of tripping the bale, the forward edge 30 of the fulcrum piece is tucked under the floor 10 of the bale conveyor chute so that the bale may pass smoothly from the chute up over the end of the fulcrum piece.

After the bale has passed up the chute and has fallen onto the table 15 so as to be disposed over the fulcrum piece with its trailing edge held up off of the floor of the table, the conveyor may run idly beneath the raised trailing edge of the bale and yet the flights of the conveyor cannot come in contact with any part of the bale to tear it or cut the bale ties or otherwise damage the bale. Because of the use of this fulcrum structure, the table length may be kept to a bare minimum, and also the bale may be sharply turned toward the wagon bed. Irrespective of whether the bale is immediately removed from the table, the bales can be picked up for loading onto a wagon bed without the possibility of damage. The use of a simple fulcrum means or ridge 20 in the table to hold the trailing edge out of contact with the flights of the conveyor, makes this possible.

While the above description has been directed to the particular structure forming the preferred form of the device, it is apparent that many modifications thereof may occur to those skilled in the art, which will fall within the scope of the following claims. It is suggested, for example, that a roller means might be substituted for the ridge forming the fulcrum means here described whereby to minimize any rubbing or friction damage. Many similar modifications of this invention can be conceived.

We claim:

1. The improvement in a bale loader having a continuously driven upfeeding conveyor, the conveyor having flights for engaging a bale of hay or the like to carry the bale to the top of the loader comprising a generally horizontally disposed table at the end of the conveyor and making an acute angle therewith to receive the bales one by one as they are fed up thereto and over the infeed margin thereof by the conveyor, said table having a raised element near its in-feed margin upon which element the individual bales fulcrum when they fall toward the main body of the table, said element being elevated above the off-feed margin of the table and lying on the conveyor side of the centre of gravity of a bale when the bale strikes it, whereby the bales fall over it to the main body of the table and their trailing ends are removed from the path of movement of the conveyor flights.

2. The improvement in a bale loader having a continuously driven up-feeding conveyor, the conveyor moving in a straight line and having flights for engaging a bale of hay or the like to carry the bale to the top of the loader comprising a generally horizontally disposed table at the end of the conveyor and making an acute angle therewith to receive the bales one by one as they are fed up thereto and over the infeed margin thereof by the conveyor, a deflecting wall fixed to one side of said table and turned at an angle to the path of said conveyor to engage the ends of the individual bales as they fall onto the table so as to partially turn the engaged bale, said table having a raised element near its in-feed margin upon which element the individual bales fulcrum when they fall toward the main body of the table, said element being elevated above the main body of the table and lying on the conveyor side of the centre of gravity of a bale when the bale strikes it, and being disposed at about right angles to said wall and near the end of the conveyor, so that the trailing end of each of the bales laying over the surface is held out of contact with the flights of the conveyor after they are delivered serially to the table and until they are removed therefrom.

3. The improvement in a bale loader having a continuously driven upfeeding conveyor, the conveyor moving upwardly in a straight line and having flights for engaging a bale of hay or the like to carry the bale to the top of the loader comprising a generally flat table at the end of the conveyor and making an acute angle therewith to receive the bales one by one as they are fed up thereto and over the infeed margin thereof by the conveyor, a deflecting wall fixed to the outside edge of said table, said wall being turned inwardly at an angle to the plane of said conveyor to direct the forward ends of the bales inwardly as they fall onto the table, a fulcrum piece coacting with said table but independent of said conveyor and whose top is elevated above the main body of the table, upon which fulcrum piece the individual bales fulcrum as they fall toward the main body of the table, the fulcrum piece lying on the conveyor side of the centre of gravity of a bale when the bale strikes it, the arrangement being such that the trailing end of each of the bales laying over the piece is held out of contact with the flights of the conveyor after they are delivered serially to the table and until they are removed therefrom.

4. The improvement in a bale loader having a continuously driven upfeeding conveyor that is centrally disposed in the floor of an inclined chute structure, the conveyor having flights extending above the plane of the floor of the chute for engaging a bale of hay or the like to carry the bale to the top of the loader, and a generally flat table at the top of the chute to receive the bales one by one as they are fed up thereto and over the infeed edge thereof by the conveyor, which improvement comprises a fulcrum piece mounted in the path of the bale to the table, and on the table side of the plane of conveyor travel of the bale bottoms and beyond the farthest upreach of the conveyor flights, upon which fulcrum piece the bales strike as they fall from the conveyor toward the main body of the table.

5. The improvement in a bale loader having a continuously driven upfeeding conveyor that is centrally disposed in the floor of an inclined chute structure, the conveyor having flights extending above the plane of the floor of the chute for engaging a bale of hay or the like to carry the bale to the top of the loader comprising, a generally flat table at the top of the chute to receive the bales one by one as they are fed up thereto and over the infeed margin thereof, the plane of which table when projected rearwardly from its infeed margin intersects the plane of conveyor travel of the bale bottoms, and a deflecting wall fixed to the outside edge of said table, said wall being turned inwardly at an angle to the path of said conveyor to direct the forward end of each of the bales inwardly as they fall onto the table, which improvement comprises a fulcrum coacting with the off-feed portion of the table upon which fulcrum the individual bales strike when they fall onto the main body of the table from the conveyor, said fulcrum being elevated above the off-feed portion of the table and lying on the conveyor side of the centre of gravity of a bale when the bale strikes it, whereby the trailing ends of the bales as turned by said deflecting wall lie in contact with the fulcrum but are elevated thereby out of contact with the flights of the conveyor.

6. In a bale loader having a generally horizontally extending bale delivery table at an elevation suitable for bale loading to a vehicle, and a conveyor whose upper end terminates substantially at the in-feed margin of said table and which projects bales upwardly to extend over the top of the table and permits them to fall thereupon, the plane of which table when projected rearwardly from its in-feed margin intersects the plane of the conveyor, the improvement which consists in the embodiment of a fulcrum transversely of the path of movement of a bale over the table and on the conveyor side of the centre of gravity of a bale which strikes it, which fulcrum is elevated above the off-feed portions of the table upon which the leading end of the bale comes to rest after it has struck the fulcrum, whereby the trailing end of the bale at rest is elevated above the topmost path of travel of all portions of the conveyor.

FREDERICK W. HARRIS.
CARL G. CRANTZ.

REFERENCES CITED

The following references are of record in the file of this patent:

UNITED STATES PATENTS

| Number | Name | Date |
|---|---|---|
| 1,882,435 | Mojonnier | Oct. 11, 1932 |
| 2,335,924 | Elholm | Dec. 7, 1943 |
| 2,367,970 | Smoker | Jan. 23, 1945 |
| 2,460,441 | Appel | Feb. 1, 1949 |
| 2,518,083 | Sims | Aug. 8, 1950 |
| 2,520,253 | Norris | Aug. 29, 1950 |